United States Patent [19]

Munden et al.

[11] Patent Number: 4,817,963
[45] Date of Patent: Apr. 4, 1989

[54] HOT MELT STRIP SEAM SEALING METHOD

[75] Inventors: Alan J. Munden, Penryn; John R. Leith, Falmouth, both of England

[73] Assignee: Hot Melt Systems Limited, Cornwall, England

[21] Appl. No.: 33,037

[22] Filed: Mar. 31, 1987

[51] Int. Cl.⁴ .................. F16J 15/10; E01C 11/02; E04B 1/68

[52] U.S. Cl. .................. 277/1; 277/167.5; 52/393; 52/395; 52/744; 52/746; 404/64; 404/69

[58] Field of Search .......... 277/1, 167.5; 52/393, 52/395, 744, 746; 404/47, 64, 69

[56] References Cited

U.S. PATENT DOCUMENTS

| | | | |
|---|---|---|---|
| 3,540,961 | 11/1970 | Shipp et al. | 404/64 |
| 3,611,888 | 10/1971 | Kavalir et al. | 404/47 |
| 3,629,986 | 12/1971 | Klittich | 404/69 |
| 3,654,005 | 4/1972 | Higgins et al. | 52/746 |

FOREIGN PATENT DOCUMENTS

| | | | |
|---|---|---|---|
| 677495 | 3/1966 | Belgium . | |
| 412448 | 4/1925 | Fed. Rep. of Germany . | |
| 252937 | 5/1977 | Fed. Rep. of Germany . | |
| 2305660 | 10/1976 | France | 277/1 |
| 151213 | 10/1981 | German Democratic Rep. | 277/1 |
| 128037 | 6/1919 | United Kingdom | 404/47 |
| 532470 | 1/1941 | United Kingdom . | |
| 711332 | 6/1954 | United Kingdom . | |
| 893924 | 4/1962 | United Kingdom . | |

*Primary Examiner*—Robert S. Ward
*Attorney, Agent, or Firm*—Gifford, Groh, Sheridan, Sprinkle & Dolgorukov

[57] ABSTRACT

A method of sealing a joint between two adjacent members comprises the steps of forming a gap between the members to be sealed and then introducing a bead of resilient solid material into the gap. The bead is subsequently treated to render it temporarily plastic or fluid so as to cause it to adhere to the facing edges of the members. This treatment can best be effected using a hot air blower. The bottom of the bead may be provided with a non-adhesive strip to prevent adhesion to the bottom of the gap, or the process may be performed in such a way that the bottom portion of the bead is not fused so that it does not adhere to the bottom of the gap.

13 Claims, 3 Drawing Sheets

HOT MELT STRIP SEAM SEALING METHOD

BACKGROUND OF THE INVENTION

Traditionally, the joints between deck planks were caulked with hemp and tar or bitumen but the service life of such materials is very short and this system required constant renewal due to deterioration under the continual attack of the environmental agents. More recently modern materials have been used in an attempt to provide a satisfactory water tight weather resistant sealant. For such materials elastomeric sealants, in particular using synthetic plastics, polysulphides, synthetic rubbers and the like have been employed in order to provide caulking which is far removed from the old established traditional methods of caulking. British Pat. No. 883,924 describes a method of sealing joints between adjacent structural members, particularly between structural plates and the planks of a ship's deck using a sealing compound, which comprises first inserting into the joint a profiled strip of synthetic plastics material which has little adhesion to the sealing compound and then covering the strip with a sealing compound, the strip extending fully across the bottom of the joint and along the full length thereof. The sealing compound, however, is a hardenable material introduced into the gap in the fluid state.

Another approach to the problem of forming a seal between deck planks is discussed in British Pat. No. 711,332 in which a solid, resilient strip having a C-shape section (or part of the section) is inserted into a groove formed in a facing surface so as to be compressed when the planks are fitted together. In this system no hardenable fluid or curable material is used, and the resilient seal does not adhere to the adjacent edges of the planks. The seal is maintained by preliminarily compressing the strip so that expansion of the joint is taken up by the expansion of the preliminarily compressed strip. A similar system is disclosed in British Pat. No. 532,470.

One of the major problems in caulking deck planking lies in the fact that timber has a great propensity to dimensional variation due to changes in moisture content of the wood and movements up to 30% of the width of a sealed joint are not uncommon. Such movements are not easily accommodated by pre-compression as in the systems described in British Pat. No. 711,332. Modern elastomeric polymer materials have been found to provide suitable degrees of both resilience to accommodate dimensional variations and resistance to the salt water and wind, and other corrosive materials which may be found on a boat. The application of such modern materials to the narrow joints between deck planks has presented some problems, however, due to the fact that the long service life required of such materials can only be satisfactorily obtained provided the adhesive properties of the material are exploited between the caulking and the edge of the plank, and not in the general plane of the decking at the substrate level. Polymer materials used for such caulking are usually applied in a liquid or paste state and in order to prevent adhesion to the substrate it is necessary to perform a preliminary operation introducing into the bottom of the joint a suitable non-adhesive material or layer which will prevent the caulking material from adhering to the substrate. Such an operation is described in British Pat. No. 893,924. This operation must be performed with care in order to ensure that no masking of the edges of the planks is effected at the same time, which would detract from the ability of the caulking material to adhere to these edges. When applying the caulking material itself, great care must be taken to avoid any overlap of this onto the faces of the planks, and this is achieved either by the preliminary application of masking tape or strip to the planks in the vicinity of the joint edges, or by subsequent grinding or sanding operations effected to remove the surface layer of the plank and any adherent caulking. This is a very time-consuming and therefore costly process. Other disadvantages of the known materials include a short shelf life, a limited available working time (where two-part materials have to be mixed prior to use), which often results in wastage if the materials cannot be used in time, the possibility of air bubbles becoming introduced during application, and the lengthy curing time during which the material must not be disturbed. Curing times can often be as long as seven days.

OBJECTS OF THE INVENTION

A primary object of the invention is to provide a method and means of sealing joints between adjacent members which, will be particularly suitable for use in sealing the joints between adjacent planks of a wooden deck.

Another object of the invention is to provide a sealing method which is quick and easy to perform.

A further object of the invention is to provide a joint sealing method which will provide a watertight seal of long service life at a reduced cost.

Still another object of the invention is to provide a joint sealing method which can be used on the planks of a deck and which allows the planks to be walked on without excessive delays for curing or setting of the sealant.

SUMMARY OF THE INVENTION

According to one aspect of the present invention, therefore, a method of sealing a joint between two adjacent members, such as deck planks or cladding panels, comprises the steps of introducing into a gap between the members a bead of resilient solid material, and treating the said resilient solid material to render it temporarily plastic or fluid in the region of the facing edges of the members without becoming adherent to any underlying substrate whereby to cause it to adhere to the facing edges of the members.

In a preferred arrangement the said treatment is effected by locally heating the material to or to the vicinity of a fusion temperature. Such heat treatment is preferably performed by passing a stream of hot air in contact with the bead and/or the edges of the members to be sealed. Alternatively, however, the heat treatment may be effected by raising the temperature of an electrical resistance heater element embedded in the bead by passing a current therethrough, although in such a case it may be necessary to provide a non-adhesive layer to the bead in order to ensure that it does not adhere to its substrate; when using hot air heating methods this problem does not arise since the heat is applied from the side remote from the substrate so that in practice the bead does not become heated to fusion point on the side thereof nearest the substrate. As a further alternative, heat treatment may be effected by applying a heating member in contact with the bead and/or the adjacent members to be sealed, such heating member having a surface raised to a suitably high temperature whereby to transmit heat by conduction to the bead.

The advantages offered by the invention are mainly that the solid strip can be inserted into a groove or space between two adjacent members without requiring any preliminary operations, and treated to render it adhesive to the facing surfaces of the elements without causing any overlap of the sealing material onto the faces of the elements and without causing the sealing material to become attached to an underlying surface so that the sealing material adheres only to the opposite facing surfaces of the gap: this means that the maximum degree of flexural resilience of the sealing material can be obtained without any shearing stresses such as would occur if the sealing material adhered to the underlying surface parallel to the exposed face of the sealed elements. A further advantage of the invention is that upon conversion to its fluid or plastics state the material flows into the seam to adopt the precise shape thereof and at the same time the material comes into intimate contact with the side walls and forms an adhesive bond therewith.

A further advantage of the invention is that it offers unlimited shelf life and an unrestricted working time, and the members sealed are not made unavailable for any length of time.

The present invention also comprehends a sealing element for sealing the joint between adjacent members such as the deck planking of a vessel or wall cladding panels of a building, comprising an elongate bead of thermoplastic material having a non-adhesive layer on one face thereof.

Preferably, the bead has two opposite substantially flat faces which are separated by a distance, determined by the thickness of the bead, which in use matches substantially that of the joint to be sealed.

Suitable materials for the present invention include any resilient thermoplastic material which can adhere to materials conventionally used in the boat building industry and in particular to wood. It has been found that ethylene vinyl acetate is capable of performing in the required manner, provided suitable additives are incorporated to increase its resistance to corrosive agents. Further additives for pigmentation or other purposes, may be introduced, such as a fluorescent material or fluorescent particles.

By selecting a section which is very slightly larger than the width of the seam, it is possible to press the bead into the seam to be sealed so that frictional contact between the sides of the seam and the bead retains it in position even if the depth of the seam is greater than that of the bead. Suitable cross sectional shapes are oval and trapezoidal, although in this latter case, which will be described in more detail below, the short parallel edge is preferably convexly curved.

Another advantage of the seam sealing method of the present invention lies in the very considerable saving of time in introducing the sealant into the seam. With the system of the present invention, unlike the prior art systems, it is unnecessary to perform any preliminary operations on the seam such as the introduction of non-adhesive layers into the bottom of the seam and/or masking of the edges of the seam. All that is required is for the bead to be positioned in the seam, and this can be done by hand simply by feeding the bead into the seam and running a finger or thumb along the top edge to ensure that it is approximately flush with, but preferably slightly proud of, the faces of the members being sealed.

Then, by use of a suitable hot air blower, of which there are several types commercially available, it is possible to raise the temperature of the bead locally to its plastic or fusion point so that it adheres to the facing edges of the members being sealed.

One reason for preferring that the face of the bead which is to be exposed with the exposed faces of the members being sealed is rounded with a convex curvature is that the changes which take place upon fusion, in particular the bonding between the material and the edges of the panels or other members being sealed, largely due to surface tension effects, can be observed visually, allowing the operator to determine the correct rate at which to move on with the heating tool.

In the alternative embodiment referred to above, in which the bead is provided with an internal electrical resistance heating element embedded therein, this heating element in use can be connected to a source of electrical current to provide, effectively, internal heating of the bead and the appropriate current and duration to effect the required heating to plastic or fusion point can then be predetermined for the circumstances of use.

In embodiments of the invention in which a non-adhesive layer is provided on the face of the bead intended to be the bottom face in the seam may be composed of any suitable material, and this needs to have only a very short service life, namely the period during which the bead is in its plastic or fluid state and during which any adhesive bonding of the material to the members being sealed is likely to take place. After this, upon cooling, the resilient material is effectively non-adhesive at its surfaces, and will not in any case adhere to the bottom of the seam. As explained above, such a layer is in any case only necessary in circumstances where it is likely that the inner face of the bead in contact with the substrate may be heated to its plastic or fusion point, and may be dispensed with if adherence to the substrate can be avoided in other ways.

Various other features and advantages of the present invention will become apparent from a study of the following descriptions of a preferred embodiment, in which reference is made to the accompanying drawings, provided purely by way of non-limitative example.

DESCRIPTION OF THE PREFERRED EMBODIMENT

Figure 1:
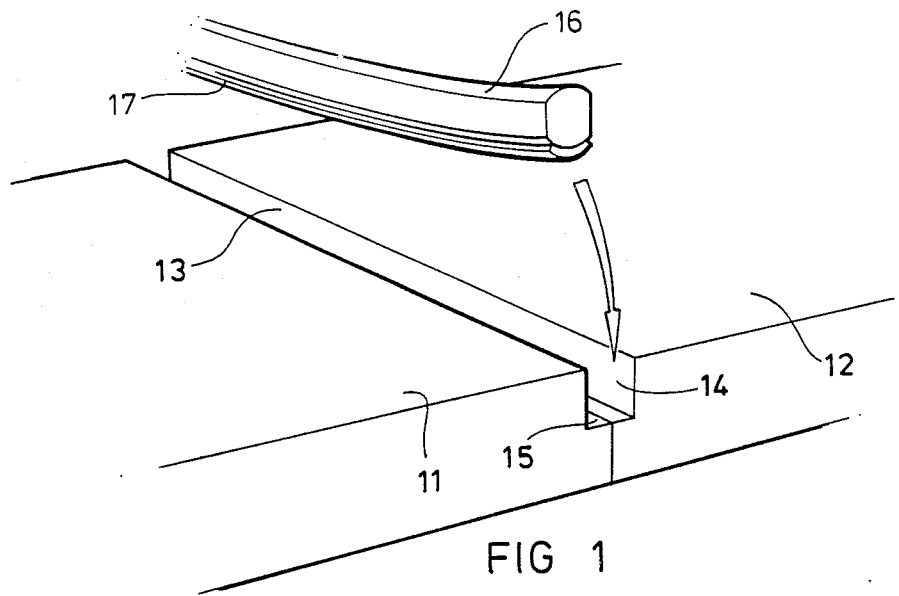
FIG. 1 is a perspective view of a first embodiment illustrating two adjacent edges of contiguous deck planks to be sealed using the sealing system of the present invention.

A typical application for the sealing system of the present invention is in edge sealing of contiguous decking planks such as the planks 11,12 only short sections of which are illustrated for the purpose of explanation. In order to seal the contiguous edges of the planks 11, 12 a channel 13 is formed by a right angle rebate 14, 15 in the upper edge portion, adjacent the exposed face, of each plank 11, 12. Sealing is effected by introducing a bead 16 of suitable material into the channel 13 and pushing this down until it occupies the position approximately illustrated in FIG. 2.

Figure 2:
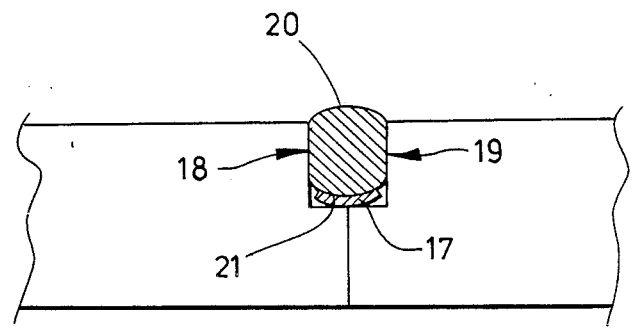
FIG. 2 is a cross section taken on the line II—II of FIG. 1 with the sealing bead in position, and before treatment.

In FIG. 2 it can be seen that the bead has an approximately oval configuration, comprising two parallel flat faces 18, 19 joined by semi-circular end portions 20, 21. The semi-circular end portion 21 is covered by a non-adhesive layer 17.

Figure 3:
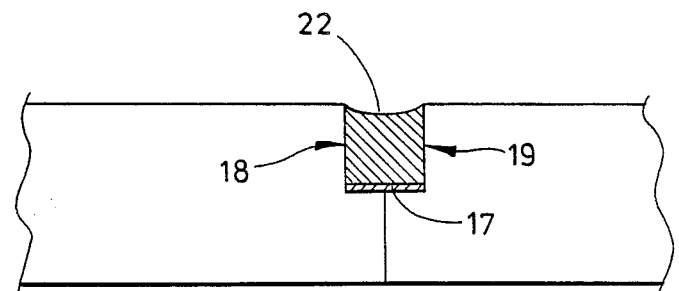
FIG. 3 is a section similar to that of FIG. 2, showing the configuration of the edge region of the deck planks after treatment of the bead.

Once the bead 16 has been fitted in position it can be heat treated such as by playing a stream of heated air onto it from a suitable hot air blowing tool, and upon reaching its plastic or fusion point the bead flows under the action of gravity to fill the shape of the channel 13, at the same time flattening out the non-adhesive strip 17 so that it occupies the bottom portion of the seam. The side walls 18, 19 of the bead, during the plastic or fluid state, adhere firmly and securely to the side walls of the channel 13 whilst the non-adhesive layer 17 prevents such bonding taking place in the bottom of the channel. The previously convex upper face 20 of the bead now becomes a concave surface 22 as illustrated in FIG. 3. In this configuration, with the opposite faces 18, 19 bonded to the adjacent edges of the blanking and the upper and lower faces free, the main body of the bead 16 is able to flex in compression and tension to accommodate variations in the width of the planks due to changes in humidity without causing any shear stresses such as would cause fatigue and ultimate rupture of the bead. A long service life is therefore ensured.

Figure 4:
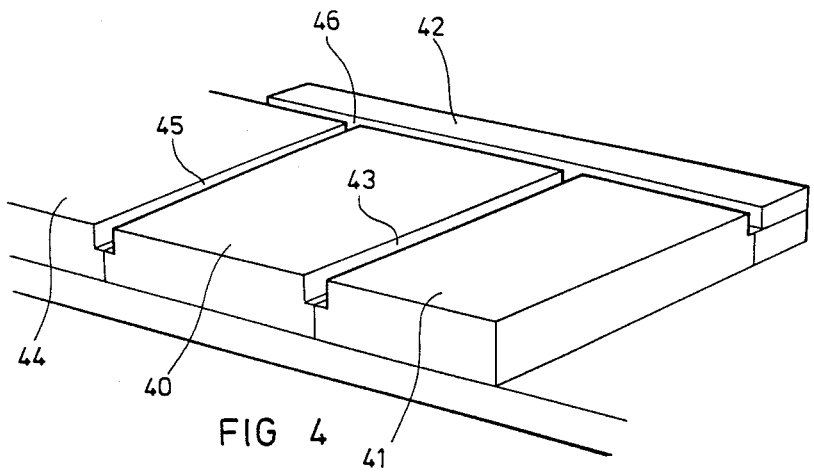
FIG. 4 is a perspective view illustrating the manner of use of the present invention where intersecting seams are present.
Figure 5:
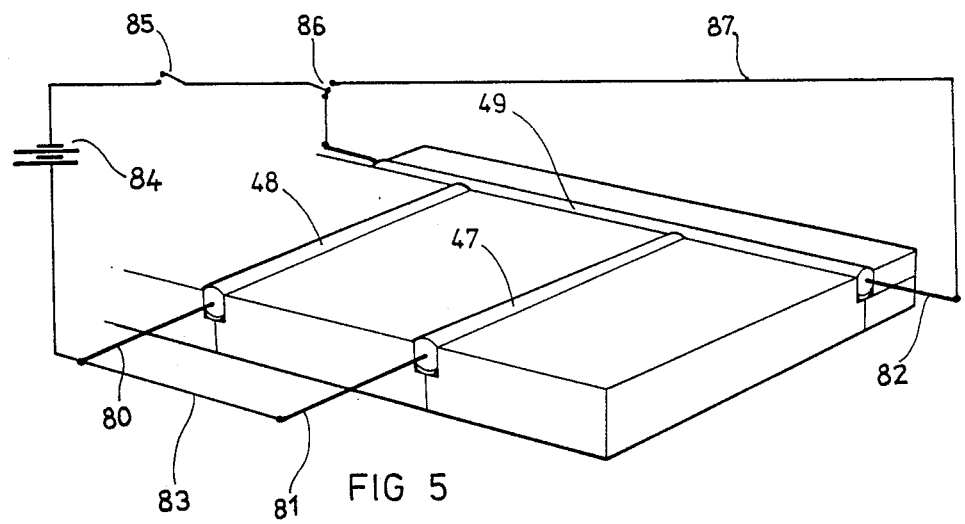
FIG. 5 illustrates a further embodiment with beads having electrical resistance heater wires fitted in the seams illustrated in FIG. 4.
Figure 6:
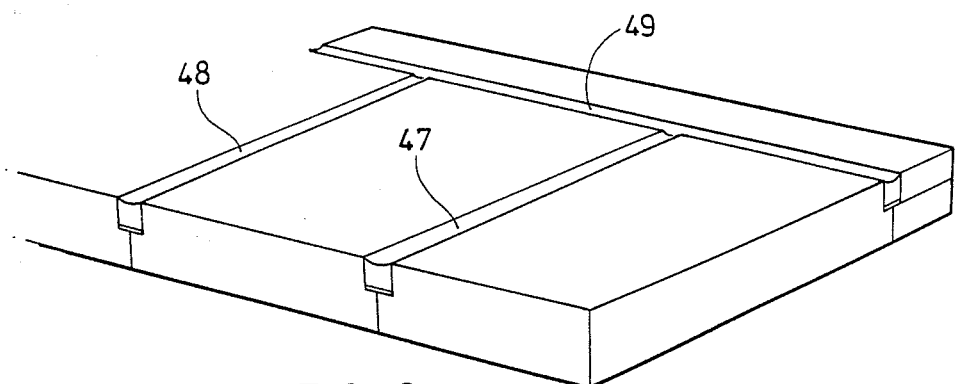
FIG. 6 is a perspective view after treatment of the bead.

In addition to its use for individual seams, joints between seams can also be accommodated as illustrated in FIGS. 4,5 and 6. Here, the ends of planks 40, 41 are to be sealed to a transverse plank 42 as well as having the joints between adjacent planks sealed in the manner described in relation to FIGS. 1 to 3. For this purpose no special techniques are required and the method of the present invention allows the joints between contacting seams to be formed in a very advantageous manner. In FIG. 4 the joint between the planks 40 and 41 is shown as having been enlarged by the formation of a channel 43 and the joint between plank 40 and plank 44 is enlarged by channel 45. A similar channel 46 is formed by appropriate rebates in the plank 42 and in the ends of the planks 41, 40 and 44. These channels 43, 45, 46 then receive resilient solid beads 47, 48, 49 respectively. These beads have internal resistance heater wires 80, 81, 82 respectively, which are shown connected by external wiring circuitry 83, 87 to a source of electrical supply 84 (illustrated as a battery although obviously this could be any other source including mains) via switches 85, 86 which can be closed selectively to ensure that current is passed through all parts of the resistance heater wire. To complete the circuits of the heater wires 80, 81 the adjacent bead 49 must be notched to expose the wire 82 for contact therewith. Alternatively it may be sufficient to cut the ends of the beads 47, 48 at right angles and to ensure that they are pushed up firmly into contact with the transverse bead 49 when fitting the beads into the channels if separate connector wires (not shown) are provided to complete the electrical circuits. Then, when the current is turned on the beads 47, 48, 49 are caused to fuse and the previously separate beads combine during this operation to form an effectively continuous shaped, branching strip which fills the channels as an integral unit.

Figure 7:
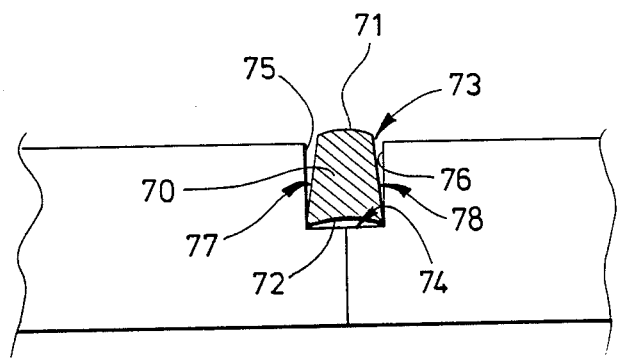
FIG. 7 is a sectional view similar to that of FIG. 2 showing an alternative embodiment in which the bead shape is different.

FIG. 7 illustrates an alternative, and in many ways preferred, embodiment in which the solid bead 70 has a trapezoidal cross section with a convexly curved upper face 71 and a slightly concavely curved lower face 72. The length of the concavely curved lower face 72 may be slightly greater than the width of the channel 73 into which the bead 70 is introduced in use in order to ensure that it firmly engages in the bottom corners of the channel and at the same time flexes the lower face 72 to increase the concave curvature thereof. Such a bead does not need an adhesive layer such as the layer 17 illustrated in the embodiment of FIGS. 1 to 3 because its particular configuration avoids the local heating of the lower region in contact with the bottom 74 of the channel 73. Further, the inclined side wall 77, 78 of the trapezoidal section bead 70, when used in a channel 73 having parallel side faces 75, 76 as illustrated in FIG. 7, form with these side faces triangular spaces which can be suffused with the hot air being blown over the element when it is being heat treated to fusion. Because of this heat enters the bead 70 from the external surfaces constituted by the side wall 77, 78 and the convexly curved upper wall 71 and the region adjacent these faces therefore melts more quickly than in the embodiment of FIGS. 1 to 3 where the heat only enters through the upper curved face. Because of this, fusion of the region of the bead in contact with the side faces 75, 76 of the channel 73 can be achieved with certainty and before the heat has travelled through the bead 70 to the bottom, concave, face 72 so that this face remains always in the solid state and does not become adherent to the lower face 74 of the channel 73. A visible change in shape of the bead 70 takes place on fusion so that the operator can clearly see that the bead is being securely fixed and sealed to the sides of the channel 73 as the heat treatment takes place, and can modify the heat treatment, by speeding up or slowing down the rate of travel of the hot air blower in order to obtain a consistent finish.

What is claimed is:

1. A process of sealing a joint between two adjacent members such as deck planks, cladding panels and the like carried on a subjacent member for support thereby, said process comprising the steps of forming a channel at the junction between at least said two adjacent members, said channel having two adjacent edge faces of said two adjacent members facing one another across the width of said channel and a channel bottom face formed as one of a shoulder of a said adjacent member, an underlying support on which said adjacent members are carried and an underlying substrate supporting said adjacent members, introducing a bead of resilient solid material into said channel, and treating said resilient solid material bead to render it temporarily one of plastic and fluid whereby to cause it to adhere to said facing edge faces of said two adjacent members, said treatment of said material of said bead being such as to maintain the resilient elasticity of the material of said solid bead subject to such treatment whereby to maintain the seal thus formed even in the event of substantial relative movement of said two adjacent members sealed by said bead.

2. The process of claim 1, wherein the steps of said treatment by which the resilient elasticity of said bead is maintained include one of avoiding and preventing the adhesion of the material of said bead to said channel bottom.

3. The process of claim 2, wherein the steps taken to prevent adhesion of the material of said bead to said channel bottom comprise restricting the heating of said bead to that part of the volume thereof spaced from said channel floor such that the part thereof in contact with said channel floor is not caused to fuse whilst the remainder of the volume thereof is fused.

4. The process of claim 2, wherein the steps taken to prevent adhesion of the material of said bead to said channel bottom comprises the preliminary application, between said bead and said channel floor, of a layer of non-adhesive material.

5. The process of claim 1 wherein said treatment comprises heating said bead at least to the vicinity of a fusion temperature of said material thereof.

6. The process of claim 5 wherein said heat treatment is effected by passing a stream of hot air in contact with said bead.

7. The process of claim 5, wherein said heating treatment is effected by raising the temperature of an electrical resistance heater element embedded in said bead by passing an electrical current therethrough.

8. The process of claim 5, wherein said heating is effected by passing a heating member in contact with said bead over the surface thereof exposed between said two adjacent members to be sealed.

9. A sealing element for use in the process of claim 1 for sealing a joint between adjacent members such as the deck planking of a vessel, wall cladding panels of a building and the like, comprising an elongate bead of thermoplastic material having a non-adhesive layer on one face thereof.

10. The element of claim 9, wherein said beam is made from an ethylene vinyl acetate.

11. The element of claim 9, wherein said bead has an electrical resistance element embedded therein.

12. The element of claim 9, wherein said non-adhesive layer is composed of waxed paper secured in position on said bead.

13. The element of claim 9, wherein the cross-section of said bead is one of rectangular, oval, namely having flat parallel faces with semicircular top and bottom walls, and trapezoidal with at least one concave wall.

* * * * *